US006693251B1

United States Patent
Ananthanarayanan et al.

(10) Patent No.: US 6,693,251 B1
(45) Date of Patent: Feb. 17, 2004

(54) METHOD FOR MANUFACTURING A METALLIC TUBULAR ASSEMBLY

(75) Inventors: Venkatasubramanian Ananthanarayanan, Beavercreek, OH (US); Dharmendra M. Ramachandra, Centerville, OH (US); Johnny R. Gentry, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/225,572

(22) Filed: Aug. 22, 2002

(51) Int. Cl.$^7$ .............................................. B23K 11/00
(52) U.S. Cl. ................... 219/59.1; 219/78.16
(58) Field of Search ........................... 219/59.1, 61.11, 219/78.01, 78.16, 101, 102, 104, 117.1

(56) References Cited

U.S. PATENT DOCUMENTS 4,676,427 A * 6/1987 Constance .................. 228/189
6,552,294 B1 * 4/2003 Ananthanarayanan et al. ... 219/

FOREIGN PATENT DOCUMENTS

DE    28 06 287 A1 * 8/1979 ........... B23K/31/06
JP    55-136584 A * 10/1980 ........... B23K/11/32

* cited by examiner

Primary Examiner—M. Alexandra Elve
Assistant Examiner—Kevin P. Kerns
(74) Attorney, Agent, or Firm—Scott A. McBain

(57) ABSTRACT

A method for manufacturing a tubular assembly. A first tube is obtained. A first tubular connector is obtained having a first and second end portions. The first end portion is metallurgically attached to the first tube. A tubular member is obtained having a third end portion. At least one of the second and third end portions includes an annular outward fold including spaced-apart first and second fold portions. The first tubular connector and the tubular member are positioned with the second end portion aligned with and contacting the third end portion. A resistance welding current path is created through the first tubular connector and the tubular member proximate the second and third end portions and the second and third end portions are relatively and deformingly moved together creating a weld zone which includes at least some of the second and third end portions.

20 Claims, 5 Drawing Sheets

METHOD FOR MANUFACTURING A METALLIC TUBULAR ASSEMBLY

TECHNICAL FIELD

The present invention relates generally to tubes, and more particularly to a method for manufacturing a tubular assembly.

BACKGROUND OF THE INVENTION

Resistance welding (also known as electric-resistance welding) is a known metallurgical process wherein metal is heated by its own resistance to a semi-fused (i.e., soft) or fused (i.e., molten) state by the passage of very heavy electric currents for very short lengths of time and then welded by the application of pressure.

Conventional methods for manufacturing a metallic tubular assembly include shaping the tubes, if and as required, to their desired shape for the tubular assembly such as by bending or hydroforming. Then, expensive manipulating equipment is used to position the shaped tubes for conventional welding as the tubular assembly is being weld-assembled.

Conventional welding includes gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. The welding arc creates a molten weld puddle which results in the welding together of the parts. A ceramic ferrule is used to contain the weld puddle when needed. Gas metal arc welding requires expensive welding equipment, the molten weld puddle tends to flow away from the joint area resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate, the tube is rotated about its longitudinal axis, and the tube end and the plate are pressed together, wherein friction causes heating, creating the weld. Friction welding requires expensive welding equipment, and the process requires a long cycle time between welds.

What is needed is a less expensive method for manufacturing a metallic tubular assembly.

SUMMARY OF THE INVENTION

A first method of the invention is for manufacturing a metallic tubular assembly and includes steps a) through f). Step a) includes obtaining a first tube. Step b) includes obtaining a first tubular connector having a first end portion and a second end portion. Step c) includes, after steps a) and b), metallurgically attaching the first end portion to the first tube. Step d) includes obtaining a tubular member having a third end portion, wherein at least one of the second and third end portions includes an outward fold, and wherein the fold includes spaced-apart first and second fold portions. Step e) includes, after steps a) through d), positioning the first tubular connector and the tubular member with the second end portion aligned with and contacting the third end portion. Step f) includes, after step e), creating a resistance welding current path through the first tubular connector and the tubular member proximate the second and third end portions and relatively and deformingly moving together the second and third end portions creating a weld zone which includes at least some of the second and third end portions.

A second method of the invention is for manufacturing a metallic tubular assembly and includes steps a) through g). Step a) includes obtaining a substantially-straight first tube. Step b) includes obtaining a first tubular connector having a first end portion and a second end portion. Step c) includes, after steps a) and b), annularly metallurgically attaching the first end portion to the first tube. Step d) includes, after step c), changing the shape of the first tube. Step e) includes obtaining a substantially-straight tubular member having a third end portion, wherein at least one of the second and third end portions includes an annular outward fold, and wherein the fold includes spaced-apart first and second fold portions. Step f) includes, after steps a) through e), positioning the first tubular connector and the tubular member with the second end portion aligned with and contacting the third end portion. Step g) includes, after step f), creating a resistance welding current path through the first tubular connector and the tubular member proximate the second and third end portions and relatively and deformingly moving together the second and third end portions creating an annular weld zone which includes at least some of the second and third end portions.

A third method of the invention is for manufacturing a metallic tubular assembly and includes steps a) through h). Step a) includes obtaining a first tube. Step b) includes obtaining a first tubular connector having a first end portion and a second end portion. Step c) includes, after steps a) and b), annularly metallurgically attaching the first end portion to the first tube. Step d) includes obtaining a second tube. Step e) includes obtaining a second tubular connector having a third end portion and a fourth end portion, wherein at least one of the second and third end portions includes an annular outward fold, and wherein the fold includes spaced-apart first and second fold portions. Step f) includes, after steps d) and e), annularly metallurgically attaching the fourth end portion to the second tube. Step g) includes; after steps a) through f), positioning the first tubular connector and the second tubular connector with the second end portion aligned with and contacting the third end portion. Step h) includes, after step g), creating a resistance welding current path through the first and second tubular connectors proximate the second and third end portions and relatively and deformingly moving together the second and third end portions creating an annular weld zone which includes at least some of the second and third end portions.

Several benefits and advantages are derived from one or more of the methods of the invention. Resistance welding is less expensive than gas metal arc welding or friction welding. Resistance welding also has a shorter cycle time between welds than gas metal arc welding or friction welding.

DESCRIPTION OF THE PREFERRED EMBODIMENTS

Figure 1:
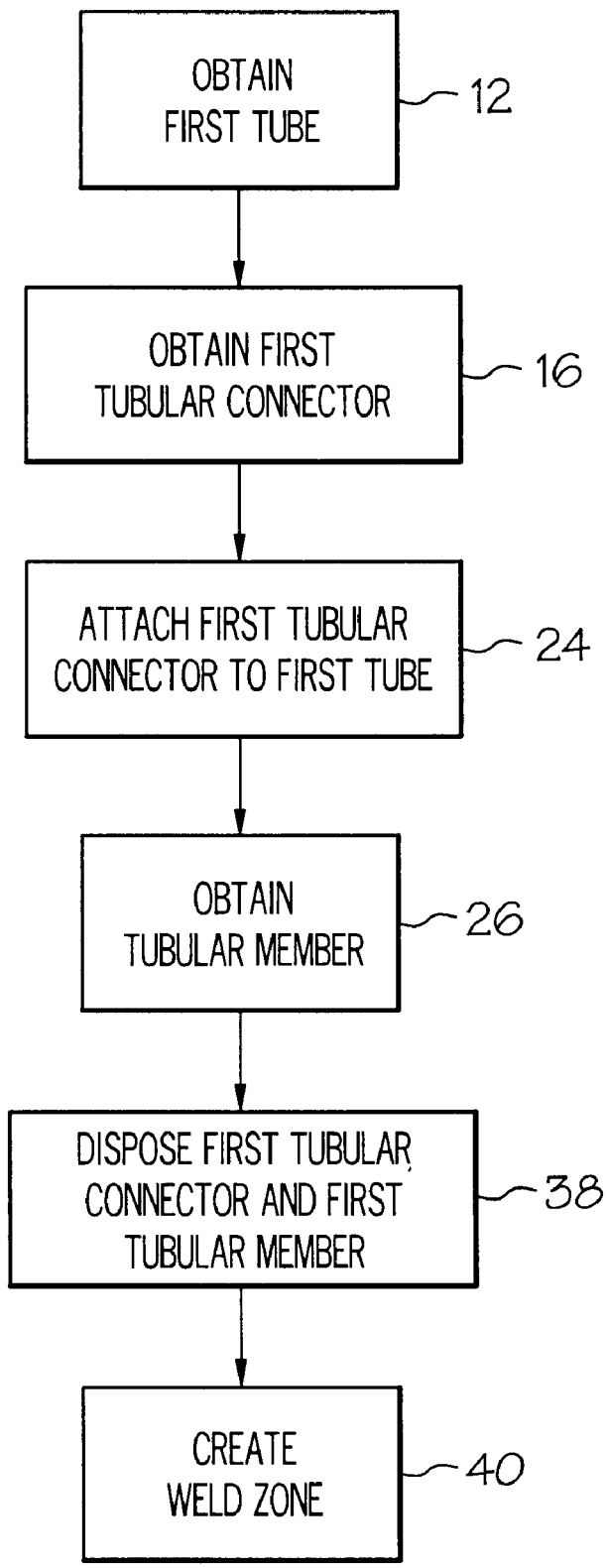
FIG. 1 is a block diagram of the first method of the invention for manufacturing a metallic tubular assembly.
Figure 2:
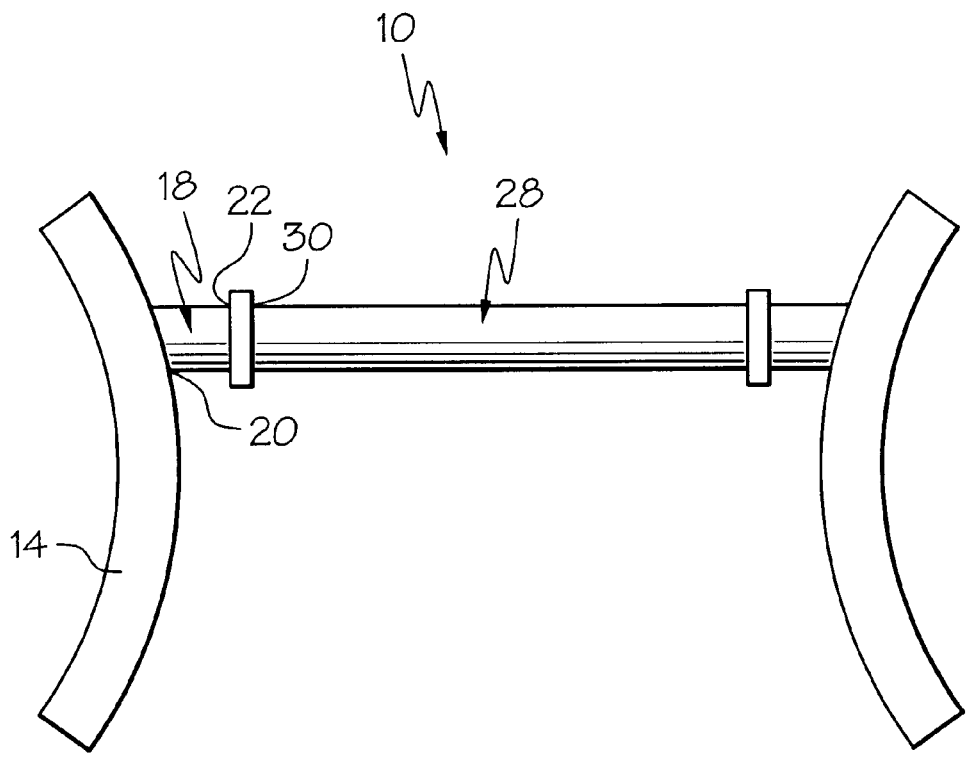
FIG. 2 is a schematic, top planar view of a first embodiment of a metallic tubular assembly manufactured, at least in part, using the first method of FIG. 1.
Figure 3:
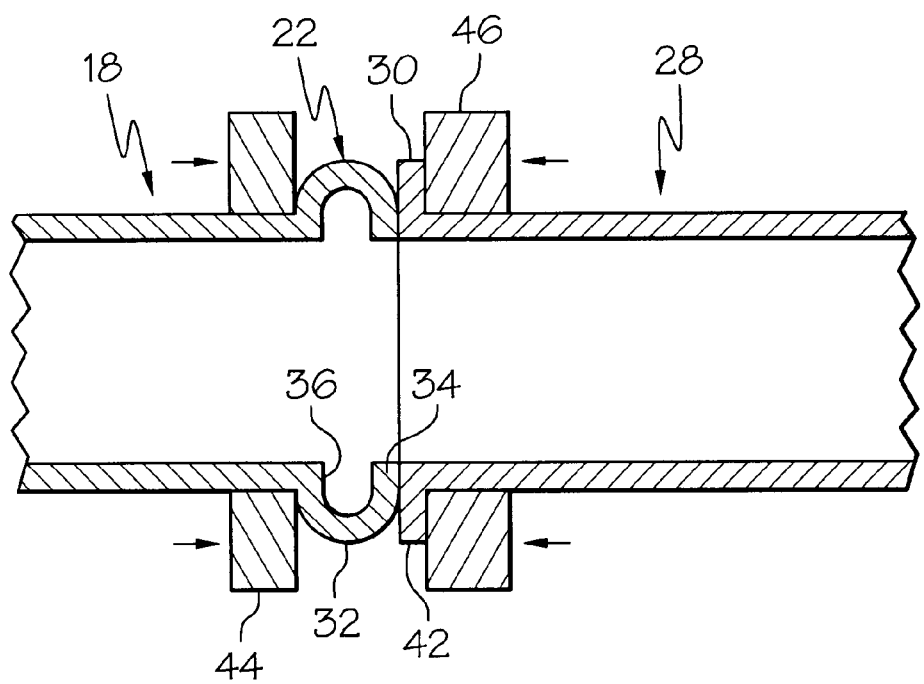
FIG. 3 is a cross-sectional view of a portion of a first tubular connector and a tubular member of FIG. 2 before the weld zone is created showing the location of the resistance-welding electrodes.

A first method of the invention is for manufacturing a metallic tubular assembly. The first method is shown in block diagram form in FIG. 1, and a first embodiment of a metallic tubular assembly 10 manufactured using the first method is shown in FIGS. 2 and 3. The first method includes steps a) through f). Step a) is labeled as "Obtain First Tube" in block 12 of FIG. 1. Step a) includes obtaining a first tube 14. Step b) is labeled as "Obtain First Tubular Connector" in block 16 of FIG. 1. Step b) includes obtaining a first tubular connector 18 having a first end portion 20 and a second end portion 22. Step c) is labeled as "Attach First Tubular Connector To First Tube" in block 24 of FIG. 1. Step c) includes, after steps a) and b), metallurgically attaching the first end portion 20 to the first tube 14. Step d) is labeled as "Obtain Tubular Member" in block 26 of FIG. 1. Step d) includes obtaining a tubular member 28 having a third end portion 30, wherein at least one of the second and third end portions 22 and 30 includes an outward fold 32, and wherein the fold 32 includes spaced-apart first and second fold portions 34 and 36. Step e) is labeled as "Dispose First Tubular Connector And First Tubular Member" in block 38 of FIG. 1. Step e) includes, after steps a) through d), disposing the first tubular connector 18 and the tubular member 28 with the second end portion 22 aligned with and contacting the third end portion 30. Step f) is labeled as "Create Weld Zone" in block 40 of FIG. 1. Step f) includes, after step e), creating a resistance welding current path through the first tubular connector 18 and the tubular member 28 proximate the second and third end portions 22 and 30 and relatively and deformingly moving together the second and third end portions 22 and 30 creating a weld zone which includes at least some of the second and third end portions 22 and 30.

The term "proximate" includes, without limitation, the term "at". By "relatively moving" is meant moving the second end portion with the third end portion stationary or moving the third end portion with the second end portion stationary or moving both the second and third end portions, as is within the level of skill of the artisan. In one variation, the other of the second and third end portions 22 and 30 includes either a flange or another outward fold engageable (and in one modification annularly engageable) with the outward fold 32 of the one of the second and third end portions 22 and 30.

In one application of the first method, such relative movement squeezes out surface contaminants from between the second and third end portions and such relative movement levels the hills and valleys between the contacting surfaces of the second and third end portions to bring surface atoms of the second end portion within atomic bonding distances with surface atoms of the third end portion. In one implementation of the first method, step f) does not melt any of the second end portion and does not melt any of the third end portion. In another implementation, step f) melts at least some of the second end portion or at least some of the third end portion or melts at least some of the second and third end portions.

In one example of the first method, the first tube 14, the first tubular connector 18, and the tubular member 28 each are a substantially-straight tube having an annularly substantially-circular cross section. In another example, the first tube 14, the first tubular connector 18, and the tubular member 28 each are a substantially-straight tube having an annularly substantially-rectangular cross section. Other examples of the first tube, the first tubular connector, and the tubular member (including a tube or tubular-connector tubular member) are left to the artisan.

In the same or a different example of the first method, step c) annularly metallurgically attaches the first end portion 20 of the first tubular connector 18 to the first tube 14. In one process, the metallurgical attachment of step c) is done by resistance welding using a welding electrode disposed inside the first tube. Other processes for performing the metallurgically attachment of step c) are left to the artisan and include gas metal arc welding and friction welding. In one variation of the first method, step c) metallurgically attaches the first end portion 20 of the first tubular connector 18 to the wall of the first tube 14, and in a different variation, step c) metallurgically attaches the first end portion 20 of the first tubular connector 18 to an end of the first tube 14.

In one enablement of the first method, the outward fold 32 is an annular outward fold, and the weld zone created in step f) is an annular weld zone. In the same or a different enablement, the second end portion 22 includes the outward fold 32, and the third end portion includes a flange 42. In one procedure, step f) uses an annular resistance-welding first electrode 44 disposed on the fold 32, uses an annular resistance-welding second electrode 46 disposed on the flange 42, and relatively moves closer together the first and second electrodes (as indicated by the unlabeled arrows in FIG. 3) to relatively and deformingly move together the second and third end portions 22 and 30 creating the weld zone. In one modification, the first electrode 44 contacts the second electrode 46 at the completion of step f). This ensures that no overheating of the weld zone will occur, as can be appreciated by those skilled in the art. In one variation of the first method, a first welding machine performs step c), and a different second welding machine performs step f).

In one implementation of the first method, there is also included, after step c) and before step e), the step of changing the shape of the first tube 14. In one variation, the shape-changing step includes bending of the first tube 14 such as by using conventional tube bending equipment known to the artisan. In another variation, the shape-changing step includes hydroform shaping the first tube 14. Hydroform shaping is a metallic tube shaping technique known to those skilled in the art.

Figure 4:
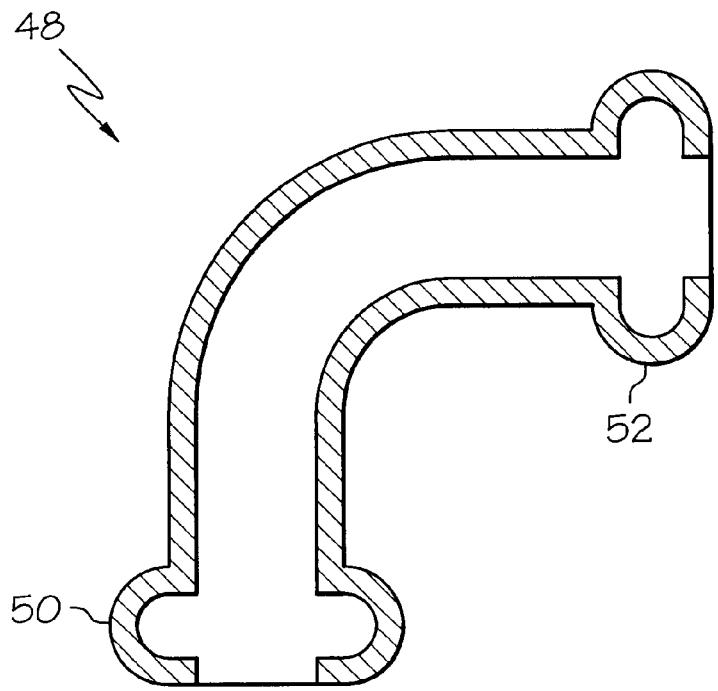
FIG. 4 is a cross-sectional view of an embodiment of an elbow tubular connector.
Figure 5:
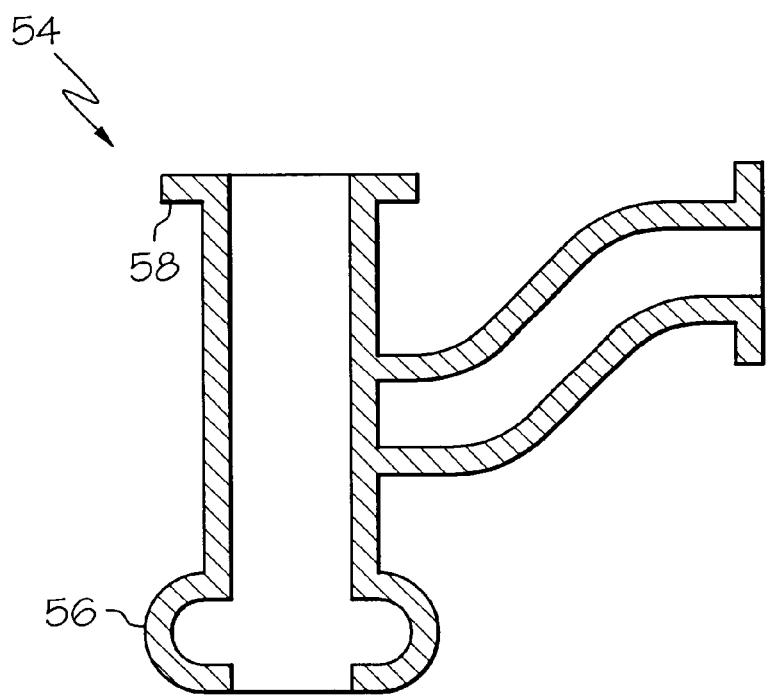
FIG. 5 is a cross-sectional view of an embodiment of a "T"-joint tubular connector.
Figure 6:
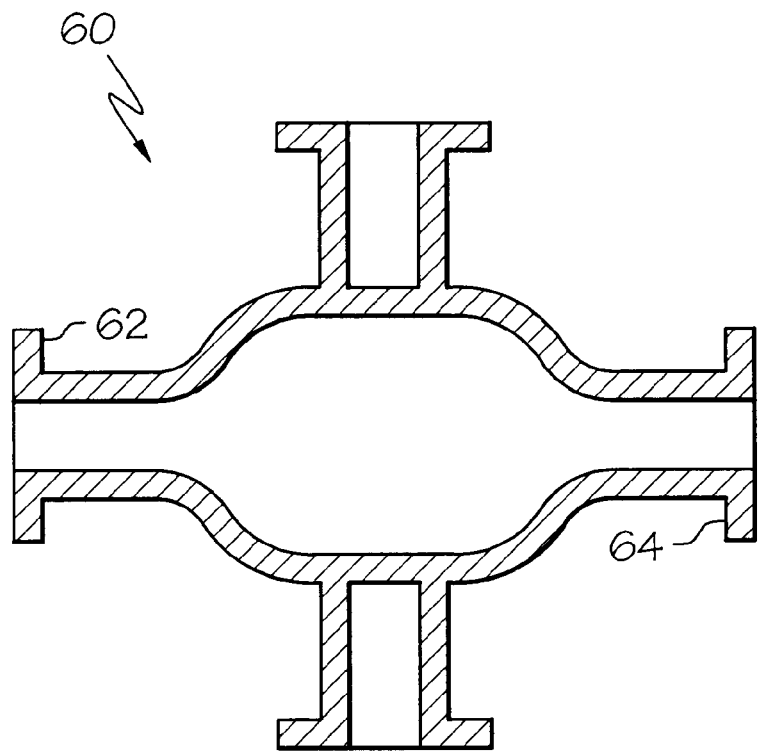
FIG. 6 is a cross-sectional view of an embodiment of a cross-joint tubular connector.
Figure 7:
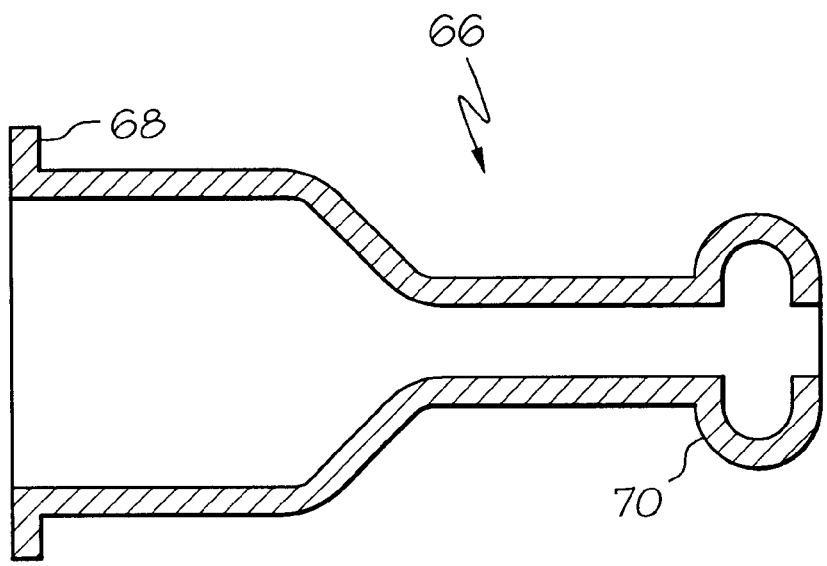
FIG. 7 is a cross-sectional view of an embodiment of a diameter-changing tubular connector.

Various embodiments of first tubular connectors obtained in step b) of the first method are shown in FIGS. 4–8. An embodiment of an elbow tubular connector 48 is shown in FIG. 4 having a first "fold" end portion 50 and a second "fold" end portion 52. An embodiment of a "T"-joint tubular connector 54 is shown in FIG. 5 having a first "fold" end portion 56 and a second "flange" end portion 58. An embodiment of a cross-joint tubular connector 60 is shown in FIG. 6 having a first "flange" end portion 62 and a second "flange" end portion 64. An embodiment of a diameter-changing tubular connector 66 is shown in FIG. 7 having a larger outside diameter at the first end portion 68 and a smaller outside diameter at the second end portion 70.

Figure 8:
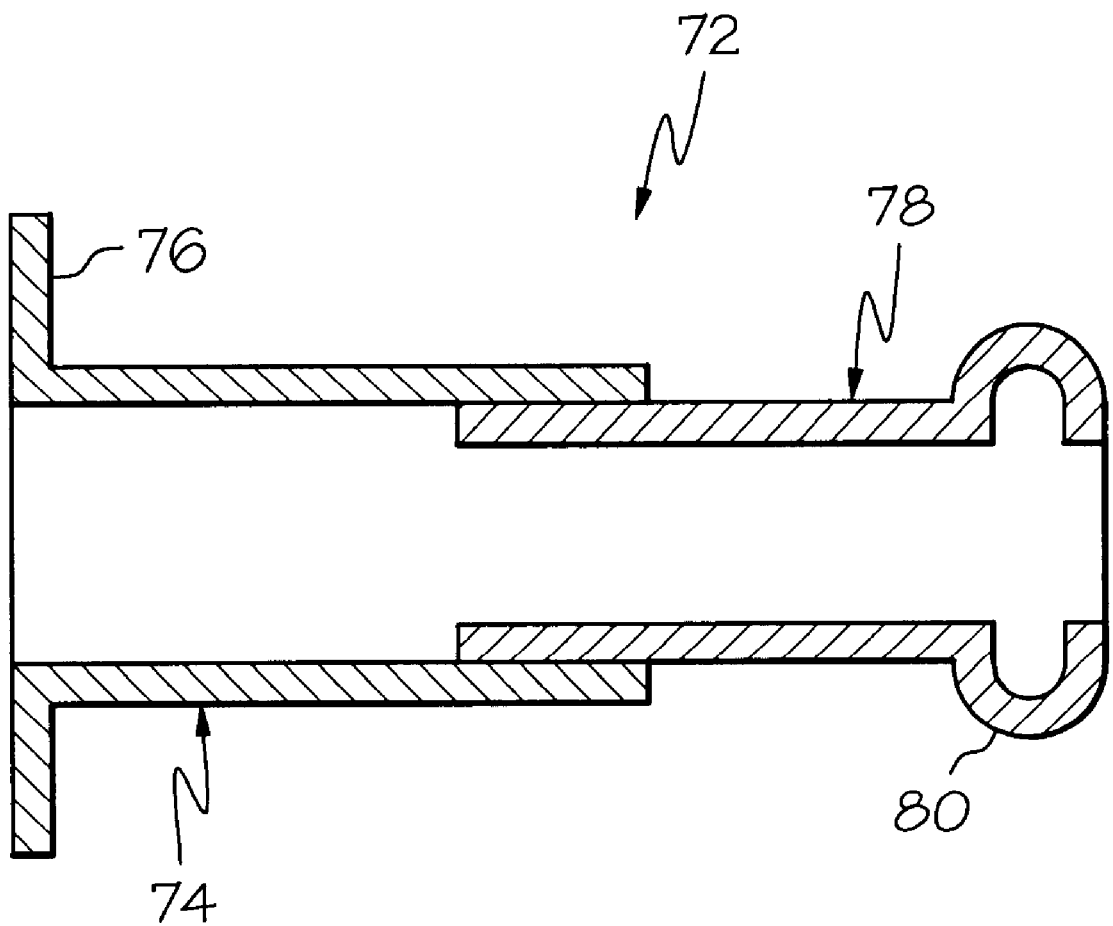
FIG. 8 is a cross-sectional view of an embodiment of a tubular connector with two solid-state-bonded sections having different metallurgical compositions.

A two-sectioned tubular connector 72 is shown in FIG. 8. The first section 74 includes the first end portion 76 of the connector 72, and the second section 78 includes the second end portion 80 of the connector 72. The first section 74 has a metallurgical composition matching that of the first tube 14, and the section 78 has a different metallurgical composition matching that of the tubular member 28. The first and second sections 74 and 78 are metallurgically joined together by a solid state bond. Examples of solid state bonding include friction welding to create a butt weld and magnetic pulse diffusion welding to create a lap weld, as can be understood by the artisan. In one choice of material, the first section consists essentially of an aluminum-based alloy, and the second section consists essentially of an iron-based alloy. Other material choices are left to those skilled in the art.

It is noted that the first method allows the first tubular connectors to be mass produced using conventional techniques. In one variation, step c) [and not also step f) as is conventionally required] is performed at a first location having appropriate tube manipulating equipment (such as allowing for a resistance-welding electrode to be disposed inside the first tube or allowing for gas metal arc welding or friction welding), and step f) is performed at a second location having much leaner welding equipment (with resistance-welding electrodes disposed only tubularly outside on a fold-fold or fold-flange joint). In one extension of the first method, additional tubes, additional tubular connectors, and additional tubular members are obtained and added using the principles of the first method to manufacture a more complex tubular assembly, as can be appreciated by the artisan.

In one construction for the first method, the first tubular connector 18 and the tubular member 28 comprise low carbon steel such as AISI 1008 to 1010 having an outside diameter of generally 6 millimeters and a thickness of generally 2 millimeters. In one execution, pulses (totaling ⅓ of a second) of electric current of generally 5,000 amperes (and in one variation 15,000 to 20,000 amperes) are applied while applying a force of generally 300 to 800 pounds to the electrodes. The first method is not limited to specific materials, dimensions, electric current, and forces, as is understood by those skilled in the art. Any weldable materials such as copper, aluminum alloy, stainless steel, etc. can be used, as can be appreciated by the artisan. The particular choice of electric current, forces, and part dimensions, etc. are within the ordinary level of skill of the artisan.

In one design for the first method, the previously-discussed electrodes 44 and 46 are installed in "T"-shaped electrode holders of a resistance welding machine (not shown). In one example, not shown, each electrode is formed from two sections which are brought together around the corresponding first tubular connector and tubular member. The electrode sections have surfaces generally corresponding to the shape of the engaged portion of the corresponding first tubular connector and tubular member. The electrode sections are attached together before installing the electrode in the corresponding upper or lower one of the "T"-shaped electrode holders of the resistance welding machine.

In one modification of the first method, the tubular member is a tube as shown in FIGS. 2 and 3. In another modification, not shown, the tubular member is another tubular connector. Another method of the invention is for manufacturing a metallic tubular assembly and includes steps a) through h) Step a) includes obtaining a first tube. Step b) includes obtaining a first tubular connector having a first end portion and a second end portion. Step c) includes, after steps a) and b), annularly metallurgically attaching the first end portion to the first tube. Step d) includes obtaining a second tube. Step e) includes obtaining a second tubular connector having a third end portion and a fourth end portion, wherein at least one of the second and third end portions includes an annular outward fold, and wherein the fold includes spaced-apart first and second fold portions. Step f) includes, after steps d) and e), annularly metallurgically attaching the fourth end portion to the second tube. Step g) includes, after steps a) through f), disposing the first tubular connector and the second tubular connector with the second end portion aligned with and contacting the third end portion. Step h) includes, after step g), creating a resistance welding current path through the first and second tubular connectors proximate the second and third end portions and relatively and deformingly moving together the second and third end portions creating an annular weld zone which includes at least some of the second and third end portions.

Several benefits and advantages are derived from one or more of the methods of the invention. Resistance welding is less expensive than gas metal arc welding or friction welding. Resistance welding also has a shorter cycle time between welds than gas metal arc welding or friction welding.

The foregoing description of several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for manufacturing a metallic tubular assembly comprising the steps of:

a) obtaining a first tube;

b) obtaining a first tubular connector having a first end portion and a second end portion;

c) after steps a) and b), metallurgically attaching the first end portion to the first tube;

d) obtaining a tubular member having a third end portion, wherein at least one of the second and third end portions includes an outward fold, and wherein the fold includes spaced-apart first and second fold portions;

e) after steps a) through d), disposing the first tubular connector and the tubular member with the second end portion aligned with and contacting the third end portion; and f) after step e), creating a resistance welding current path through the first tubular connector and the tubular member proximate the second and third end portions and relatively and deformingly moving together the second and third end portions creating a weld zone which includes at least some of the second and third end portions.

2. The method of claim 1, also including, after step c), and before step e), the step of changing the shape of the first tube.

3. The method of claim 2, wherein the shape-changing step includes bending the first tube.

4. The method of claim 2, wherein the shape-changing step includes hydroform shaping the first tube.

5. The method of claim 1, wherein the other of the second and third end portions has a flange.

6. The method of claim 5, wherein step f) uses an annular resistance-welding first electrode disposed on the fold and uses an annular resistance-welding second electrode disposed on the flange, and wherein step f) relatively moves closer together the first and second electrodes to relatively and deformingly move together the second and third end portions creating the weld zone.

7. The method of claim 6, wherein step c) uses a resistance-welding electrode disposed inside the first tube.

8. The method of claim 7, wherein a first welding machine performs step c), and a different second welding machine performs step f).

9. The method of claim 1, wherein the first tubular connector obtained in step b) is an elbow connector.

10. The method of claim 1, wherein the first tubular connector obtained in step b) is a "T"-joint connector.

11. The method of claim 1, wherein the first tubular connector obtained in step b) is a cross-joint connector.

12. The method of claim 1, wherein the first tubular connector obtained in step b) has a larger outside diameter at the first end portion and a smaller outside diameter at the second end portion.

13. The method of claim 1, wherein step c) metallurgically attaches the first end portion to the wall of the first tube.

14. The method of claim 1, wherein step c) metallurgically attaches the first end portion to an end of the first tube.

15. The method of claim 1, wherein the first tube obtained in step a) is a substantially straight tube having an annularly substantially-circular cross section.

16. The method of claim 1, wherein the first tube obtained in step a) is a substantially straight tube having an annularly substantially-rectangular cross section.

17. The method of claim 1, wherein the first tubular connector obtained in step b) has a first section including the first end portion and a second section including the second end portion, wherein the first section has a metallurgical composition matching that of the first tube, wherein the second section has a different metallurgical composition matching that of the tubular member, and with the first and second sections metallurgically joined together by a solid state bond.

18. The method of claim 1, wherein a first welding machine performs step c), and wherein a different second welding machine performs step f).

19. A method for manufacturing a metallic tubular assembly comprising the steps of:
a) obtaining a substantially-straight first tube;
b) obtaining a first tubular connector having a first end portion and a second end portion;
c) after steps a) and b), annularly metallurgically attaching the first end portion to the first tube;
d) after step c), changing the shape of the first tube;
e) obtaining a substantially-straight tubular member having a third end portion, wherein at least one of the second and third end portions includes an annular outward fold, and wherein the fold includes spaced-apart first and second fold portions;
f) after steps a) through e), disposing the first tubular connector and the tubular member with the second end portion aligned with and contacting the third end portion; and
g) after step f), creating a resistance welding current path through the first tubular connector and the tubular member proximate the second and third end portions and relatively and deformingly moving together the second and third end portions creating an annular weld zone which includes at least some of the second and third end portions.

20. A method for manufacturing a metallic tubular assembly comprising the steps of:
a) obtaining a first tube;
b) obtaining a first tubular connector having a first end portion and a second end portion;
c) after steps a) and b), annularly metallurgically attaching the first end portion to the first tube;
d) obtaining a second tube;
e) obtaining a second tubular connector having a third end portion and a fourth end portion, wherein at least one of the second and third end portions includes an annular outward fold, and wherein the fold includes spaced-apart first and second fold portions;
f) after steps d) and e), annularly metallurgically attaching the fourth end portion to the second tube;
g) after steps a) through f), disposing the first tubular connector and the second tubular connector with the second end portion aligned with and contacting the third end portion; and
h) after step g), creating a resistance welding current path through the first and second tubular connectors proximate the second and third end portions and relatively and deformingly moving together the second and third end portions creating an annular weld zone which includes at least some of the second and third end portions.

* * * * *